July 9, 1968
G. H. COOKE ET AL
3,391,718
VEGETABLE TRIMMER
Filed Feb. 16, 1966
3 Sheets-Sheet 1
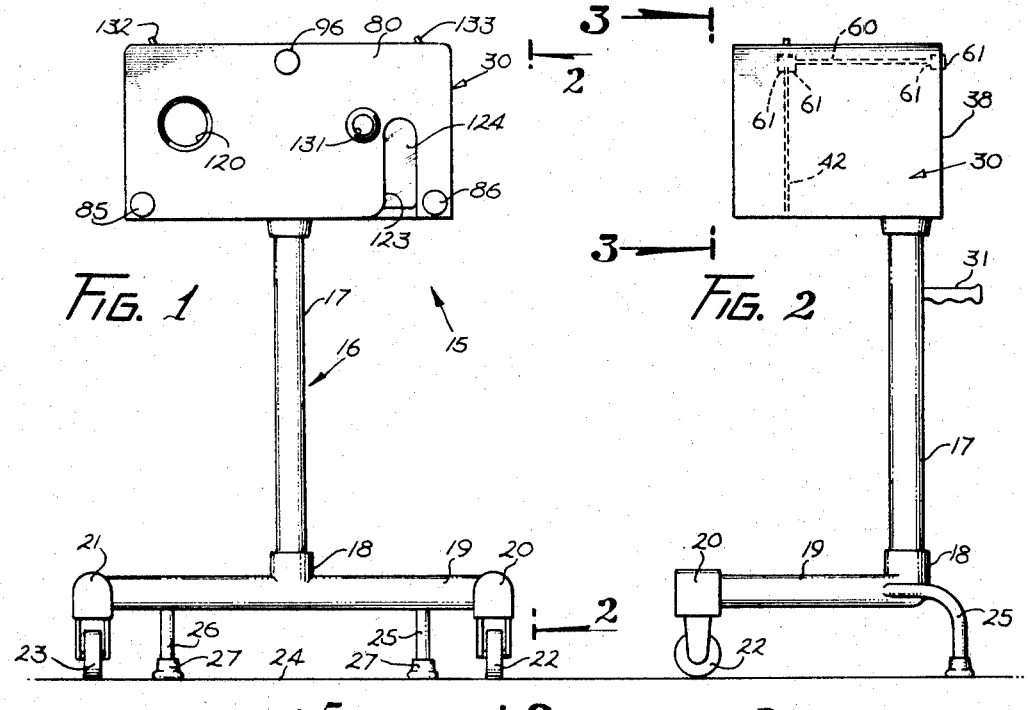
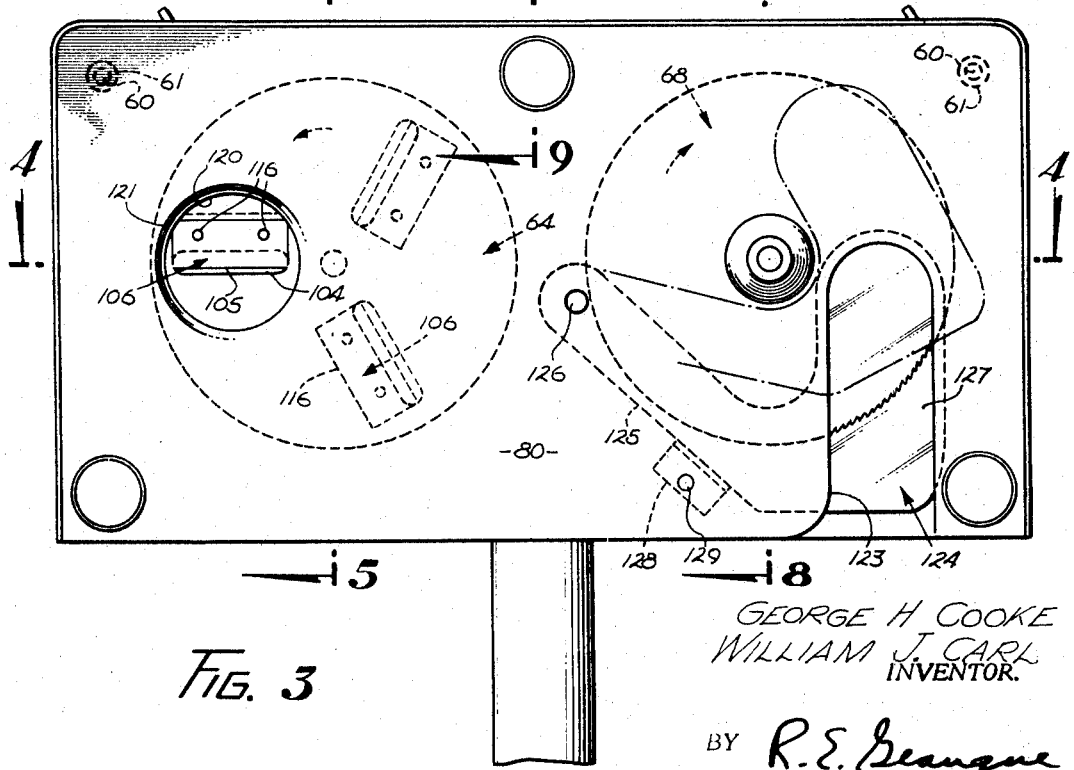
GEORGE H. COOKE
WILLIAM J. CARL
INVENTOR.
BY R. E. Geangue
ATTORNEY

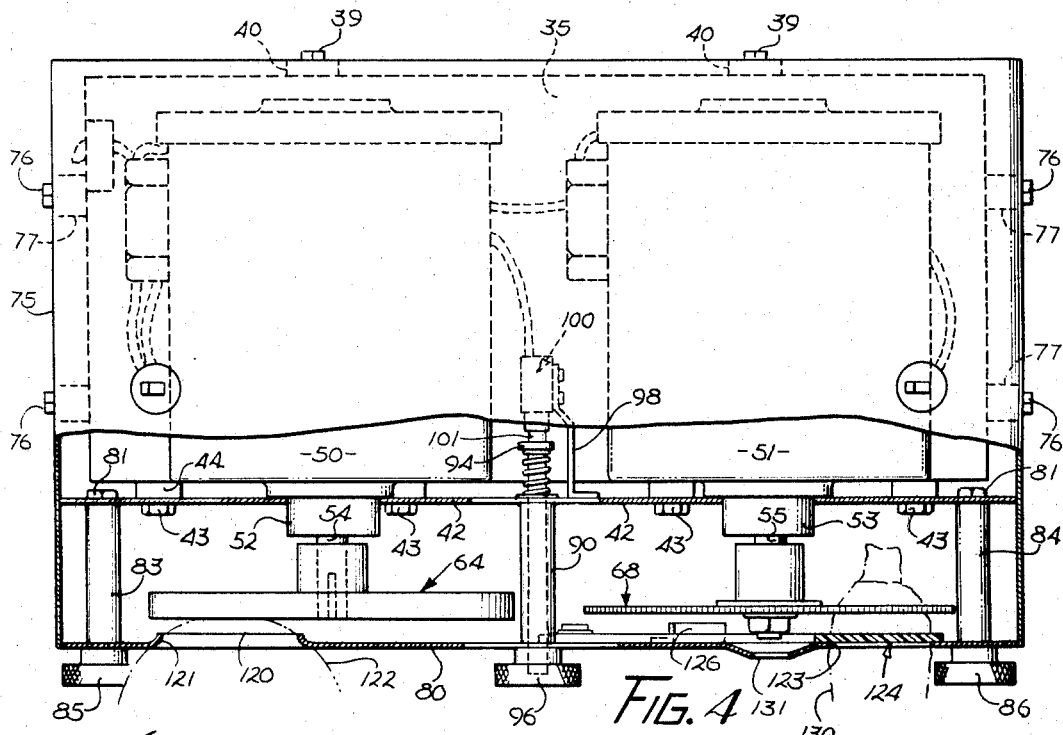
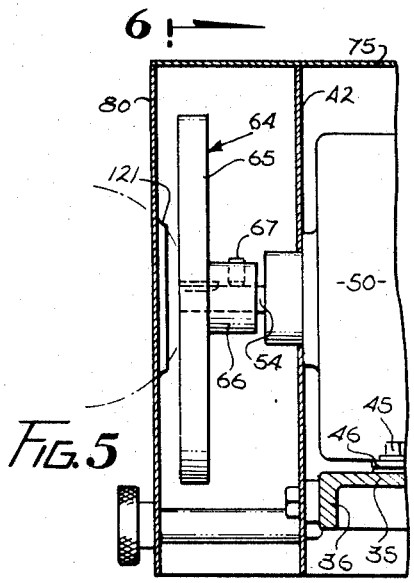
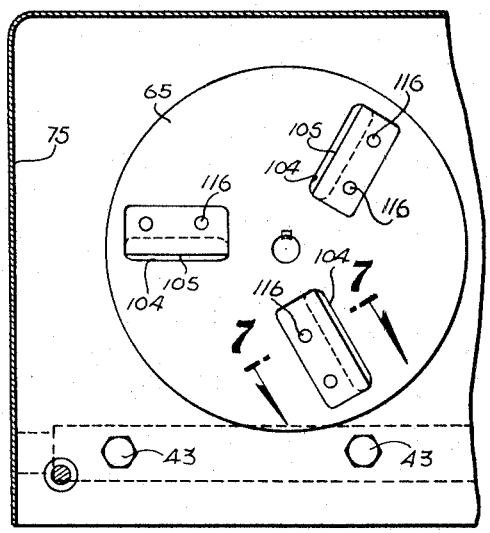
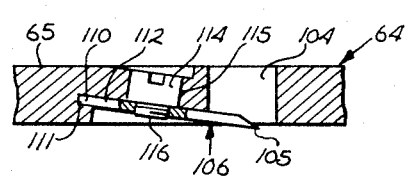

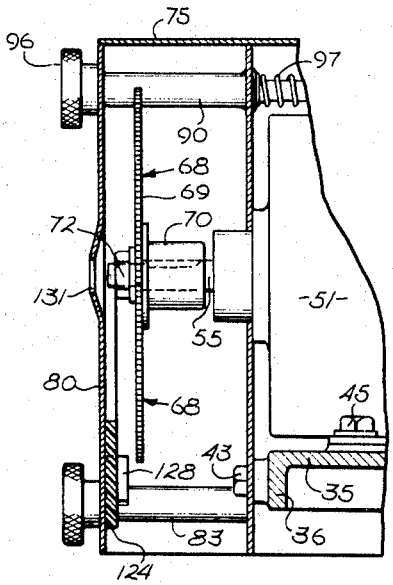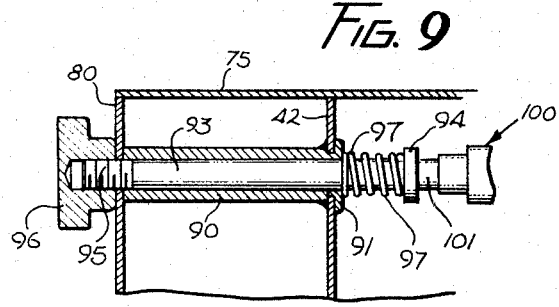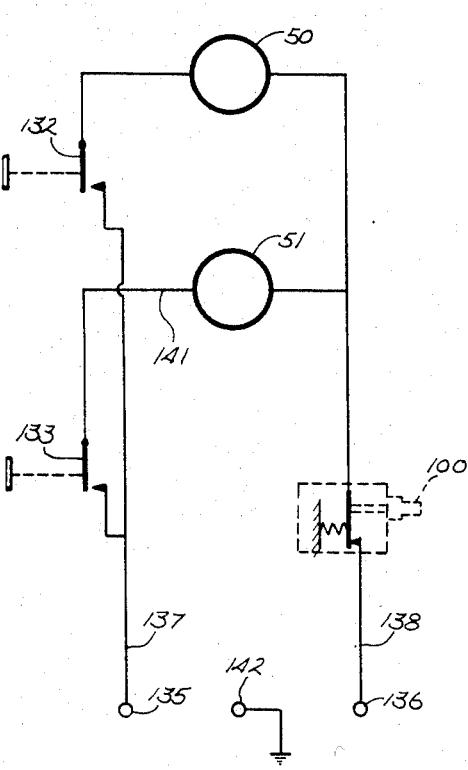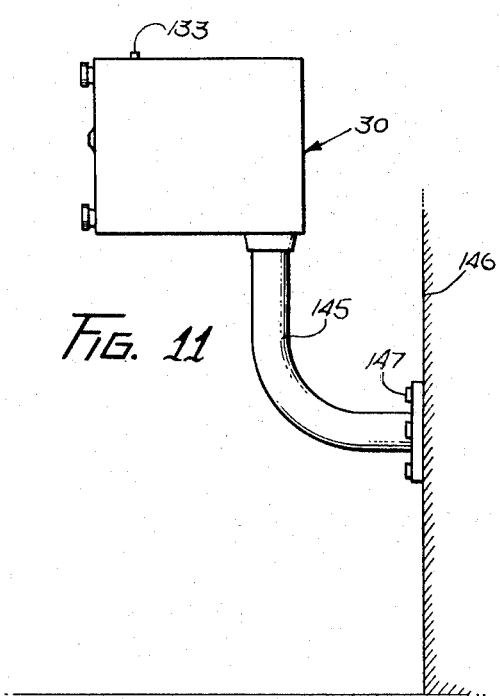
GEORGE H. COOKE,
WILLIAM J. CARL
INVENTOR.

United States Patent Office 3,391,718
Patented July 9, 1968

3,391,718
VEGETABLE TRIMMER
George H. Cooke, 18521 Prairie St., and William J. Carl, 8601 Oak Park Ave., both of Northridge, Calif. 91324
Filed Feb. 16, 1966, Ser. No. 527,815
3 Claims. (Cl. 146—81)

ABSTRACT OF THE DISCLOSURE

A vegetable trimmer having a powered trimming cutter mounted within a protective casing having an open ended access slot along which articles to be trimmed may be moved into trimming engagement with the cutter, and a movable shield which normally covers the slot and is retracted by each article during its movement along the slot into trimming engagement with the cutter.

---

This invention relates to a vegetable trimmer and more particularly to a vegetable trimmer for cutting off the stalk end of ears of fresh corn, the butt end of heads of lettuce and the leafy ends of carrots, beets and the like.

At present, the trimming of vegetables, such as corn and lettuce, is performed at individual markets which receive untrimmed vegetables in crates. Market personnel trim the vegetables by hand with an ordinary knife in order to place the vegetables in condition for retail sale. A large volume of vegetables must be trimmed every day and because of the speed required, many accidents result to market personnel. The present invention provides a motorized vegetable trimmer which protects market personnel to the maximum possible extent while providing a device by which the vegetable trimming can be done with extreme speed and minimum manual effort.

The device of the present invention comprises a housing containing power means for a rotary face cutter and for a rotary saw. These cutting components can be located side by side or at opposite ends of the casing. A protective cover panel covers each of these components and is provided with an interlock which is associated with one of the fastening means for the panel so that when the cover panel is not assembled or becomes loose, the cutting components cannot be operated. Also, the cover panel or plate contains an inwardly dished surface having an opening for the butt end of a head of lettuce and the opening is located opposite the path of travel of the blades of the face cutter. The dished side adjacent the opening engages the lettuce and prevents the lettuce from being pushed too far against the face of the cutter while the butt end is removed. Also, the cover panel has a slot opening opposite a portion of the rotary saw and a pivoted secondary shield located between the saw and panel normally covers the slot when the saw is not in use. The shield is held in normal position against a stop by gravity and can be raised by an article inserted edgewise into the slot to expose only the portion of the saw. Therefore, the portion of the circular saw exposed to the operator is limited to that required to remove the unwanted portion of the vegetable, such as the stalk end of an ear of corn. Once the trimmed vegetable is removed from the slot, the shield again assumes the normal, fully protective position. The cutting components can be mounted on a stand which is equipped with rollers so that the trimming device can be easily moved from one location to another within the storage area of a market.

It is therefore an object of the present invention to provide a vegetable trimmer which is equipped with cutter means to remove undesirable parts of various vegetables before they are placed on display.

Another object of the invention is to provide a vegetable trimmer having a protective cover panel for the cutting means which is equipped with an interlock so that the power means for driving the cutter means cannot be operated if the cover panel is removed or loosely attached.

Another object of the present invention is to provide a vegetable trimmer having a face cutter for trimming the butt end of lettuce and similar objects and having a rotary saw for trimming the stalk end of corn and similar objects.

A further object of the present invention is to provide a vegetable trimmer having a dished panel surface for engaging a head of lettuce after its butt end has been removed by a face cutter.

Another object of the invention is to provide a vegetable trimmer having a movable protective shield for a circular saw which is moved by the article being cut to uncover only the operating area of the circular saw.

These and other objects of the invention not specifically set forth will become readily apparent from the accompanying description and drawings in which:

FIGURE 1 is a front elevational view showing the cover plate for the cutting components;

FIGURE 2 is a side elevational view along line 2—2 of FIGURE 1;

FIGURE 3 is an enlarged view of the protective cover plate along line 3—3 of FIGURE 2 showing the dished opening opposite the face cutter and the slot opposite the circular saw;

FIGURE 4 is a horizontal section along line 4—4 of FIGURE 3 illustrating the power means for driving the cutting members and the interlock switch for the cover panel;

FIGURE 5 is a vertical section along line 5—5 of FIGURE 3 showing the face cutter;

FIGURE 6 is a vertical section along line 6—6 of FIGURE 5 illustrating the face cutter;

FIGURE 7 is a section taken along line 7—7 of FIGURE 6 showing one of the blades of the face cutter;

FIGURE 8 is a vertical section along line 8—8 of FIGURE 3 showing the movable shield for the rotary cutter;

FIGURE 9 is a vertical section along line 9—9 of FIGURE 3 showing the interlock switch for the cover plate;

FIGURE 10 is a schematic wiring diagram for the power means consisting of two electric motors; and FIGURE 11 is a modification of the vegetable trimmer in which it is stationarily supported on a wall.

Referring to the embodiment of the invention chosen for purposes of illustration only, the vegetable trimmer 15 has a stand 16 consisting of an upright post 17 threaded at its lower end to a socket 18 on a U-shaped tube 19. Caster fittings 20 and 21 are connected to the ends of the U-shaped tube 19 in order to support caster rollers 22 and 23, respectively, which roll upon the support surface 24. A pair of curved legs 25 and 26 are welded at one end to the U-shaped tube 19 and have rubber pads 27 at the other end for engaging the surface 24 in order to hold the post 17 in upright position. The casing 30 for the cutting members is located at the upper end of post 17 and a handle 31 is connected to the post slightly above the middle thereof. When it is desired to move the vegetable trimmer, the handle 31 is gripped to tilt the device forwardly onto the rollers 22 and 23 so that the trimmer 15 can be manually moved to any desired location.

The casing 30 comprises a rectangular base plate 35 having a downwardly projecting flange 36 around the periphery thereof. A back panel 38 is secured to a lower portion of the base plate 35 by means of screws 39 connected to bosses 40 carried by the flange 36. Also, an intermediate upright panel 42 is connected to the base 35 by means of screws 43 threaded to bosses 44 on the flange 36. Two motors 50 and 51 are attached to the base plate 35 by means of bolts 45 passing through lugs 46 on the motors so that both motors will be rigidly supported on the base plate 35. While only one lug 46 is illustrated, it is understood that each motor will have a plurality of such lugs on both sides for securing the motors.

The intermediate panel 42 contains openings for snugly receiving the bearings 52 and 53 of the motors 50 and 51, respectively, and the motor shafts 54 and 55, respectively, extend beyond the intermediate panel 42. The motors 50 and 51 are attached to the base plate 35 before the back panel 38 and the intermediate panel 42 are secured to the base plate. The panels 38 and 42 are also connected together by a pair of rods 60, one of which is located at each of the upper corners of the panels. Each rod has a pair of nuts 61 at each end on opposite sides of a panel in order to firmly hold the panels a fixed distance apart (see FIGURES 2 and 3).

A face cutter 64 comprises a face plate 65 having hub 66 which is keyed to the shaft 54 of the motor 50 by set screws 67. Also, a rotary saw 68 is held by a nut 72 against a hub 70 which is keyed to shaft 55 of motor 51 and the saw has cutting teeth 69 around its circumference. A U-shaped casing member 75 extends from the back plate 38 over the intermediate panel 42 to abut cover panel 80 which covers face cutter 64 and circular cutter 68. The lower edges of the U-shaped member 75 are connected to the flange 36 of base 35 by means of screws 76 threaded into bosses 77. The protective cover plate 80 is located at the front end of the member 75 so that the face cutter and the rotary saw are located in the space between intermediate panel 42 and plate 80. Bolts 81 and 82 extend through the lower corners of the panel 42 and plate 80 and through spacer sleeves 83 and 84, respectively, and nuts 85 and 86 are threaded onto bolts 81 and 82, respectively, to hold plate 80 against the spacers. The upper center of the cover plate 80 is spaced from the intermediate panel 42 by a sleeve 90 having a rolled over end 91 secured to panel 42. A bolt 93 extends through sleeve 90 and has an enlarged flange 94 at one end thereof. A nut 96 is threaded onto the other end 95 of bolt 93 to hold the cover plate 80 against the end of sleeve 90. A spring 97 is located between sleeve end 91 and the flange 94 in order to continually bias the bolt 93 toward the switch button 101 of microswitch 100. A bracket 98 rigidly attaches the microswitch to panel 42 in position opposite the bolt 93. When the nut 96 is tightened down to hold the protective cover plate 80 against the intermediate plate 42 by the spring force, the flange 94 is moved against spring 97 to permit the switch button 101 to extend and close the microswitch so that the microswitch is normally closed when the protective cover plate 80 is in the assembled position covering the face cutter 64 and the circular saw 68. When the cover plate 80 is loosened or removed by loosening or removing the nut 96, the spring 97 moves the flange 94 against the button 101 and opens the switch 100 thereby breaking the circuit to the motors 50 and 51. Bolt 93 and sleeve 90 will remain supported by the intermediate plate 42 after the nut 96 is removed.

The rotary saw 68 can be of standard construction and fabricated of sufficiently heavy metal to withstand the cutting loads ordinarily encountered in vegetable trimming. The face cutter 65 contains a plurality of radially extending openings 104 and the cutting edge 105 of a blade 106 extends across each opening intermediate the sides of the opening. Each blade 106 is substantially rectangular in shape and the blade edge 110 is received in a groove 111 in the face plate 65. An angular support surface 112 for each blade extends from one of the grooves 111 and each blade is held in position on a surface 112 by a pair of screws 114, each of which is slidably inserted into an opening 115 when end 116 is threaded into the blade 106. When the face cutter is rotated in a counterclockwise direction, the material removed by each cutting edge 105 can pass through an opening 104 and drop downwardly between intermediate plate 42 and the protective cover plate 80. Because of the angle of the blade to the plate 65, the cutting edge 105 of each blade projects outwardly away from the plate surface in order to provide a cutting action. The counterclockwise rotation causes the removed material to move downwardly and away from the rotary saw 68.

The cover plate 80 contains a dished opening 120 located opposite the path of rotation of the blades 106 and the opening 120 is surrounded by an inwardly turned flange 121. The opening 120 has a diameter large enough to permit the butt end of a head of lettuce 122 to be inserted through cover panel 80 against the face cutter for removal by the cutter blades 106. However, the opening 120 is small enough so that the head engages the flange 121 after the desired amount of butt end has been removed (see FIGURES 4 and 5). Therefore, damage to the head by removal of too much lettuce is prevented. While the heads will vary in size, the variation at the butt end is not sufficient to permit too much removal from the smaller heads. In trimming the lettuce, it is only necessary for an unskilled laborer to insert the butt end of one head of lettuce after another into the opening 120 and produce sufficient movement toward the face cutter to remove the desired amount of the butt end.

The cover plate 80 has a slot 123 which extends from the bottom edge of the plate over a portion of the rotary saw blade 68. A gravity shield 124 has an arm 125 which is pivoted at one end to the protective cover plate 80 by the bolt 126. The shielding portion 127 is large enough to substantially cover the slot 123 when the shield 124 is in its lower position of FIGURE 3. The shield is normally held by gravity in this position against the stop 128 which is attached to the protective plate 80 by screw 129. When it is desired to remove the stalk end of an ear of corn or the leafy end of carrots or other vegetables, this end is inserted into the open end of slot 123 and moved upwardly toward the cutting edge of the rotary blade. This upward movement pivots the shield 124 into the upper dotted line position of FIGURE 3 so that the article can come into contact with the saw and be moved far enough past the cutting edge to trim the vegetable. In FIGURE 4, an ear of corn 130 is illustrated in position in slot 123 prior to raising the ear against the cutter blade. After the stalk end is cut off, it will fall downwardly between the intermediate plate 40 and the protective cover plate 80. When the ear is then removed from the slot 123, the shield 124 will immediately return to its lower position to prevent accidental injury to the operator. The cover panel 80 contains an opening 131 located opposite the end of shaft 55 to permit the cutter 68 to be positioned close to panel 80.

It is therefore apparent that the protector plate 80 gives maximum protection to the operator since it limits the amount of movement of an article towards the face cutter and gives only limited access to the rotary saw blade. In addition, the protection is augmented by the shield 124 which covers the slot 123 when the rotary blade is not in use.

In order to provide flexibility in the operation of the device, the motors 50 and 51 can be separately operated by switches 132 and 133, respectively. Referring to the circuit illustrated in FIGURE 10, the motors 50 and 51 are connected in parallel between the terminals 135 and 136 by lines 137 and 138. The microswitch 100 is located in line 138 and switch 132 is located in line 137 to control the operation of motor 50. The motor 51 is connected between lines 137 and 138 by line 141 which contains switch 123 to control the operation of the motor 51. When either switch is closed, the corresponding motor will operate provided that the interlock switch 100 is closed by tightening down the nut 96 which holds the retainer plate 80 against the sleeve 90 to assure that the retainer plate 80 is in position. The casing is grounded at the terminal 142.

A modification of the vegetable trimmer is shown in

FIGURE 11 wherein the casing 30 is supported at the top end of a curved arm 145. The lower end of the arm is secured to wall 146 by means of bolts 147 so that the trimmer is fixed to the wall and cannot be moved around. Also, instead of having two motors, a single motor can be utilized to drive both the face cutter and the rotary cutter at opposite ends thereof. By rotating the face cutter in a counterclockwise direction and the rotary saw in a clockwise direction, the cuttings from each are moved downwardly and away from each other. Various other modifications are contemplated by those skilled in the art without departing from the spirit and scope of the invention as herein defined by the appended claims.

What is claimed is:

1. A vegetable trimmer comprising:
   power means having shaft means;
   a rotary cutter having cutting teeth about its periphery and connected to said shaft means for rotation with said shaft means in a normally generally vertical plane;
   a normally generally vertical cover panel located adjacent said cutter at the opposite side of said cutter from said power means and substantially covering the outside face of said cutter;
   an access slot in said panel opening through and extending upwardly from the lower edge of said panel and over a portion of the cutting edge of said cutter along which a vegetable can be moved into trimming engagement with said cutter;
   a shield pivotally attached at one end to said panel and biased downwardly by gravity to a position wherein said shield covers said slot;
   a stop carried by said covered panel and engaged by said shield when in its lowermost position in which said shield covers said slot; and
   said shield moving upwardly along said slot with the vegetable being trimmed.

2. A vegetable trimmer comprising:
   a casing having a cover panel;
   power driven trimming means mounted within said casing behind said panel for movement along a path located in a plane generally parallel to said panel;
   said panel having an access slot opposite said path and opening at one end through an edge of said panel whereby an article to be trimmed may be inserted into said slot through the open end thereof and then moved along said slot into trimming engagement with said trimming means with a continuous generally unidirectional motion;
   a shield mounted on said panel for movement along said slot from the open end thereof by the article being trimmed; and
   means for urging said shield in the opposite direction along said slot to a position wherein said shield substantially covers said slot.

3. A vegetable trimmer according to claim 2 wherein:
   said cover panel is normally disposed in a generally vertical plane;
   said access slot opens through and extends upwardly from the lower edge of said panel; and
   said shield is mounted on said panel for downward movement along said slot under the action of gravity to said position wherein said shield substantially covers said slot.

References Cited

UNITED STATES PATENTS

| | | | |
|---|---|---|---|
| 1,366,568 | 1/1921 | Knapp | 146—84 |
| 1,724,598 | 8/1929 | Johnston | 146—67 |
| 2,511,464 | 6/1950 | Cover | 146—84 |
| 2,876,810 | 3/1959 | Peterson et al. | 143—159 |
| 3,017,913 | 1/1962 | Sintetos | 146—81 |

W. GRAYDON ABERCROMBIE, *Primary Examiner.*